No. 796,423. PATENTED AUG. 8, 1905.
R. HOFFMANN.
CONSTRUCTION OF JOINTS IN TUBINGS FOR SHAFTS AND TUNNELS.
APPLICATION FILED SEPT. 15, 1904.

UNITED STATES PATENT OFFICE.

RUDOLF HOFFMANN, OF STYRUM-ON-THE-RUHR, GERMANY.

CONSTRUCTION OF JOINTS IN TUBINGS FOR SHAFTS AND TUNNELS.

No. 796,423.          Specification of Letters Patent.          Patented Aug. 8, 1905.

Application filed September 15, 1904. Serial No. 224,545.

*To all whom it may concern:*

Be it known that I, RUDOLF HOFFMANN, a citizen of the German Empire, and a resident of Styrum-on-the-Ruhr, Rhineland, Germany, have invented certain new and useful Improvements in the Construction of Joints in Tubings for Shafts and Tunnels of Mines, of which the following is a specification, reference being had to the accompanying drawings, in which—

Figure 1:
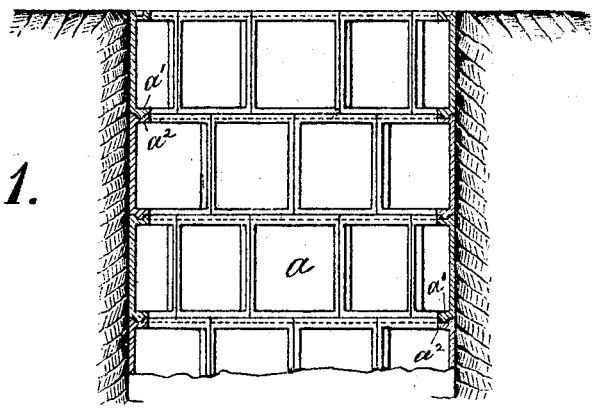
Figure 2:
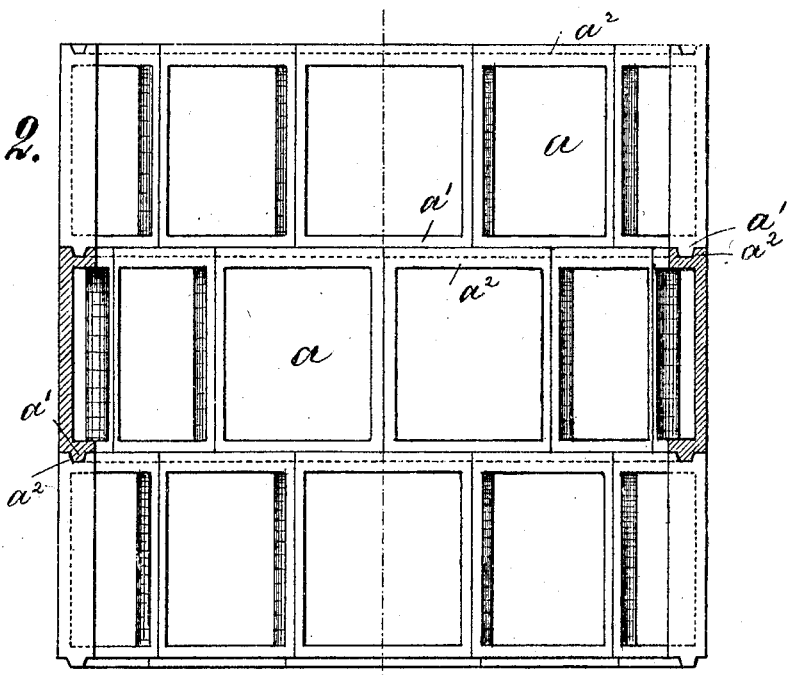
Figure 3:
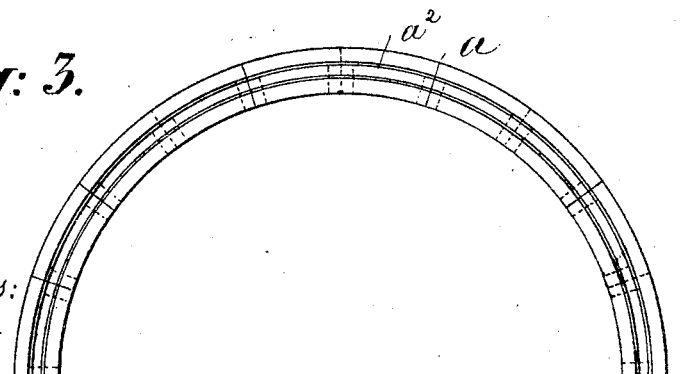

Figure 1 is a vertical section through a shaft provided with my improved lining. Fig. 2 is a side view, partly in section, of the lining; and Fig. 3, a plan of Fig. 2.

In tunnel and mining work the walls of tunnels and shafts are often provided with a cylindrical lining consisting of a series of iron cylinders forming a water-tight passage, each of the said cylinders being made up of a number of arcs or segments bolted together, the cylinders made up in such way being joined to each other by annular flanges of flat and plain surface and provided with holes in which suitable bolts are inserted, the said holes being of such size that the bolts can be conveniently inserted, and consequently the latter have some play in the said holes. Between the adjoining surfaces is placed some suitable packing to make the tubing water-tight. The ground surrounding the shaft or tunnel is frequently of such nature that it exerts a pressure against the tubing against which the several portions of the cylinders, which are comparatively thin in proportion to the diameter of the cylinder, are not always proof, and the latter is therefore exposed to deformation and even breakage, the more so as the flatness of the surfaces of the said annular flanges and the looseness of the bolts prevent the adjoining rings from affording each other a sufficient support. This objection is particularly annoying in vertical shafts where it is impracticable to remove any deformed or broken portion of the tubing and replace it by a new one, and the only remedy is to insert another lining or tubing of smaller diameter, an operation connected with expense, and reducing the size of the shaft to the detriment of its hauling capacity.

My invention relates to an improved construction of the joints between the cylinders of the tubing and their several parts, which increases considerably the strength of the lining and the mutual support. It consists of providing the surfaces in the aforesaid circular flanges with annular grooves and ribs in such a way that the ribs of the flanges of one cylinder fit into the grooves of the flanges of the next adjoining cylinder.

Instead of providing a groove in one flange and a rib in the adjoining one both adjoining flanges may have grooves, in which case a washer with a rib or ribs on both sides fitting in the said grooves is placed between the two flanged surfaces.

The section of the grooves and ribs may be of rectangular shape to secure a good lateral holdfast for the said ribs in the said grooves. While there will have to be left some play for each rib in each corresponding groove, this play should be reduced as much as practicable to secure the least possible amount of dislocation of two adjoining cylinders. The smallest radial dislocation will be obtained if the arcs or segments composing each cylinder are long, as in this case the possible angle of deformation in the longitudinal joints in the said arcs is but small. Any play in the ribs of the grooves may be dispensed with altogether if their section is slightly conical. The lateral holdfast of the ribs must, however, not be neglected and a tight fit in radial direction be secured. The edges of the ribs may be slightly rounded off to protect them from injury, but there must still be a good side surface for support.

By these improvements the deformation of any cylinders or portions of the same will be obviated, the support mentioned above as deficient being now secured by the rigidity and strength of support of the adjoining cylinders, particularly if the longitudinal joints uniting the several arcs or segments of each cylinder are not forming one line, but are made to break joints, each joint terminating about in the middle of the next adjoining cylinder, as the bending strength of the component arc-plates and flanges of the adjoining cylinders will prevent a straining of those of the cylinders which are to sustain the aforementioned pressure.

The letters $a$ represent the arched metal plates of the shaft-lining laid in courses so that the plates of one course break joint with those of the adjoining courses. Each plate $a$ is provided with a grooved top flange $a^2$ and with a tongued bottom flange $a'$. Thus the tongues projecting from the bottom of one course enter the grooves on the top of the next course to produce a firm connection between all the courses.

I am aware that a groove-and-rib arrangement has been and is being used in many cases to strengthen joints; but in those cases the whole arrangement as well as the conditions and proportions of the details and the objects in view are different from mine. Thus tunnel-linings have been proposed of brick masonry where the several stones are provided with ribs and corresponding grooves. The ribs are rounded off and require considerable place to provide room for the mortar, and the bricks are of small dimensions, the result being that the play in the grooves allows the bringing together of adjoining stones and their movement within a great angular range of relative positions. Similar conditions are true when timber linings are used, for which grooves and projections or feathers have likewise been proposed at the ends of the timbers. In both cases the radial shifting of the brick-stones or of the single timbers may effectively be prevented, but the necessary play in the grooves, together with the relatively small dimensions of the parts and the softness or brittleness of the material, will in no way prevent the relative angular dislocation of two or more adjoining sectional parts of the tubing in question.

What I claim as my invention, and desire to protect by Letters Patent, is—

A shaft-lining composed of a number of arched metal plates provided with horizontal ribs and with corresponding horizontal grooves of rectangular or similar cross-section, in such a way that the projections have a firm hold in the grooves in a radial direction, and with longitudinal flanges that break joint, whereby the bending strength of the circumferential flanges will impart strength to the longitudinal joints and prevent them from gaping at the inner or outer edges, substantially as specified.

Signed by me at Düsseldorf, Germany, this 13th day of August, 1904.

RUDOLF HOFFMANN.

Witnesses:
WILLIAM ESSEWEIN,
PETER LIEBER.